(12) United States Patent
Noponen et al.

(10) Patent No.: US 10,559,836 B2
(45) Date of Patent: Feb. 11, 2020

(54) METHOD AND ARRANGEMENT FOR DISTRIBUTING REACTANTS INTO A FUEL CELL OR INTO AN ELECTROLYZER CELL

(71) Applicant: Elcogen Oy, Vantaa (FI)

(72) Inventors: Matti Noponen, Espoo (FI); Olli Himanen, Espoo (FI); Jari Pennanen, Helsinki (FI)

(73) Assignee: ELCOGEN OY, Vantaa (FI)

( * ) Notice: Subject to any disclaimer, the term of this patent is extended or adjusted under 35 U.S.C. 154(b) by 0 days.

(21) Appl. No.: 15/194,069

(22) Filed: Jun. 27, 2016

(65) Prior Publication Data
US 2016/0308225 A1    Oct. 20, 2016

Related U.S. Application Data

(63) Continuation of application No. PCT/FI2013/051207, filed on Dec. 27, 2013.

(51) Int. Cl.
*H01M 8/00* (2016.01)
*H01M 8/0273* (2016.01)
(Continued)

(52) U.S. Cl.
CPC .......... *H01M 8/0273* (2013.01); *C25B 15/08* (2013.01); *H01M 8/0265* (2013.01); *H01M 8/04753* (2013.01); *H01M 2008/1293* (2013.01)

(58) Field of Classification Search
CPC ............. H01M 8/0273; H01M 8/2483; H01M 8/2432; H01M 8/2457; H01M 8/04201;
(Continued)

(56) References Cited

U.S. PATENT DOCUMENTS 6,884,536 B1    4/2005 Hatoh et al.
6,921,602 B2 *  7/2005 Diez ................... H01M 8/0271
                                        429/456
(Continued)

FOREIGN PATENT DOCUMENTS

DE    10 2013 008815 A1    11/2013
JP       06-290795 A        10/1994
(Continued)

OTHER PUBLICATIONS

International Search Report (PCT/ISA/210) dated Aug. 19, 2014, by the European Patent Office as the International Searching Authority for International Application No. PCT/FI2013/051207.
(Continued)

*Primary Examiner* — Nicholas P D'Aniello
(74) *Attorney, Agent, or Firm* — Buchanan Ingersoll & Rooney PC

(57) ABSTRACT

A fuel flow guiding arrangement is disclosed for a solid oxide fuel cell wherein the arrangement is configured for guiding oxygen rich side gas to and from an electrolyte element. The arrangement includes a flow field plate for each cell to arrange flows in the cell, a flow distribution area on the flow field plate, and a flow outlet area on the flow field plate. The arrangement can guide fuel feed flow to the flow distribution area from sides of a fuel cell, and can turn at least one of the fuel feed flow on the flow distribution area and fuel outlet flow on the flow outlet area to equalize flow distribution on the electrolyte element. A fuel flow adjusting structure can essentially homogenously adjust at least one of the fuel feed flow and fuel outlet flow over the electrolyte element.

5 Claims, 7 Drawing Sheets

(51) Int. Cl.
*H01M 8/0265* (2016.01)
*C25B 15/08* (2006.01)
*H01M 8/04746* (2016.01)
*H01M 8/124* (2016.01)

(58) Field of Classification Search
CPC ........... H01M 8/04753; H01M 8/0258; H01M 8/0265
See application file for complete search history.

(56) References Cited

U.S. PATENT DOCUMENTS

| | | | |
|---|---|---|---|
| 8,277,996 B2 | 10/2012 | Okusawa et al. | |
| 2004/0151960 A1 | 8/2004 | Rock | |
| 2004/0151973 A1 | 8/2004 | Rock | |
| 2005/0008911 A1 | 1/2005 | Kaye | |
| 2005/0014059 A1 | 1/2005 | Kaye | |
| 2005/0079400 A1* | 4/2005 | Sugiura | H01M 8/0206 429/483 |
| 2005/0084725 A1 | 4/2005 | Arthur et al. | |
| 2006/0134502 A1 | 6/2006 | Garceau | |
| 2006/0204826 A1 | 9/2006 | Borchers | |
| 2007/0178359 A1 | 8/2007 | Peng et al. | |
| 2007/0269703 A1 | 11/2007 | Kaye | |
| 2008/0081239 A1 | 4/2008 | Okusawa et al. | |
| 2009/0202886 A1 | 8/2009 | Kaye | |
| 2009/0239129 A1 | 9/2009 | Seido et al. | |
| 2013/0316263 A1 | 11/2013 | Roshanzamir et al. | |

FOREIGN PATENT DOCUMENTS

| | | |
|---|---|---|
| JP | 2001-325971 A | 11/2001 |
| JP | 2007-200864 A | 8/2007 |
| WO | WO 2005/020346 A2 | 3/2005 |

OTHER PUBLICATIONS

International Preliminary Report on Patentability (PCT/IPEA/409) dated Mar. 15, 2016, by the European Patent Office as the International Preliminary Examining Authority for International Application No. PCT/FI2013/051207.

Office Action issued by the U.S. Patent and Trademark Office in the U.S. Appl. No. 15/715,896, dated Dec. 4, 2018, U.S. Patent and Trademark Office, Alexandria, VA. (17 pages).

Office Action issued by the U.S. Patent and Trademark Office in the U.S. Appl. No. 15/715,896, dated Jul. 23, 2019, U.S. Patent and Trademark Office, Alexandria, VA. (13 pages).

* cited by examiner

METHOD AND ARRANGEMENT FOR DISTRIBUTING REACTANTS INTO A FUEL CELL OR INTO AN ELECTROLYZER CELL

RELATED APPLICATION

This application claims priority as a continuation application under 35 U.S.C. § 120 to PCT/FI2013/051207 filed as an International Application on 27 Dec. 2013 designating the U.S., the entire content of which is hereby incorporated by reference in its entirety.

FIELD

Most of the energy of the world is produced by oil, coal, natural gas or nuclear power. All these production methods have issues, for example, availability and friendliness to environment. As far as the environment is concerned, especially oil and coal cause pollution when they are combusted. Nuclear power involves, at least, a storage of used fuel issue.

The present disclosure relates to arranging input reactant distribution in a Solid Oxide Fuel Cell (SOFC) stack or in a Solid Oxide Electrolyzer Cell (SOEC) stack. A fuel cell causes input reactant fuel gas on an anode electrode and gaseous oxidizer (oxygen) on a cathode electrode to react in order to produce electricity. Electrolyzer reactions are reverse to fuel cell, i.e. electricity is used to produce fuel and oxygen. SOFC and SOEC stacks include stacked cell elements and separators in a sandwiched manner wherein each cell element is constituted by sandwiching an electrolyte, the anode side and the cathode side. The reactants are guided by flow field plates to the porous electrodes.

BACKGROUND INFORMATION

Especially because of environmental issues, new energy sources, more environmentally friendly and, for example, having a better efficiency than the above-mentioned energy sources, have been developed. Fuel cells, by which energy of fuel, for example biogas, is directly converted to electricity via a chemical reaction in an environmentally friendly process and electrolysers, in which electricity is converted to a fuel, are promising future energy conversion devices.

Renewable energy production methods, such as photovoltaic and wind power, face issues in seasonal production variations as their electricity production is limited by environmental effects. In the case of over production, hydrogen production through water electrolysis is suggested to be one of the future energy storing options. Furthermore, an electrolysis cell can also be utilized to produce high quality methane gas from renewably biogas stores.

A fuel cell, as presented in FIG. 1, includes an anode side 100 and a cathode side 102 and an electrolyte material 104 between them. In solid oxide fuel cells (SOFCs) oxygen 106 is fed to the cathode side 102 and it is reduced to a negative oxygen ion by receiving electrons from the cathode. The negative oxygen ion goes through the electrolyte material 104 to the anode side 100 where it reacts with fuel 108 producing electrons, water and also typically carbon dioxide ($CO_2$). Anode 100 and cathode 102 are connected through an external electric circuit 111 having a load 110 for the fuel cell withdrawing electrical energy alongside heat out of the system. The fuel cell reactions in the case of methane, carbon monoxide and hydrogen fuel are shown below:

Anode: $CH_4 + H_2O = CO + 3H_2$ $CO + H_2O = CO_2 + H_2$ $H_2 + O^{2-} = H_2O + 2e^-$ Cathode: $O_2 + 4e^- = 2O^{2-}$ Net Reactions: $CH_4 + 2O_2 = CO_2 + 2H_2O$ $CO + 1/2 O_2 = CO_2$ $H_2 + 1/2 O_2 = H_2O$ In an electrolysis operating mode (solid oxide electrolysis cells (SOEC)) the reaction is reversed, i.e. heat, as well as electrical energy from a source 110, are supplied to the cell where water and often also carbon dioxide are reduced in the anode side forming oxygen ions, which move through the electrolyte material to the cathode side where de-ionization to oxygen takes place. It is possible to use the same solid electrolyte cell in both SOFC and SOEC modes. In such a case and in the context of this description the electrodes are typically named anode and cathode based on the fuel cell operating mode, whereas in purely SOEC applications the oxygen electrode may be named as the anode, and the reactant electrode as the cathode.

Solid oxide electrolyser cells operate at temperatures which allow high temperature electrolysis reaction to take place, said temperatures being typically between 500-1000° C., but even over 1000° C. temperatures may be useful. These operating temperatures are similar to those conditions of the SOFCs. The net cell reaction produces hydrogen and oxygen gases. The reactions for one mole of water are shown below, with reduction of water occurring at the anode:

Anode: $H_2O + 2e^- \text{--->} 2H_2 + O^{2-}$

Cathode: $O^{2-} \text{--->} 1/2 O_2 + 2e^-$

Net Reaction: $H_2O \text{--->} H_2 + 1/2 O_2$.

In Solid Oxide Fuel Cell (SOFC) and Solid Oxide Electrolyzer (SOE) stacks the flow direction of the cathode gas relative to the anode gas internally in each cell as well as the flow directions of the gases between adjacent cells, are combined through different cell layers of the stack. Further, the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

A SOFC delivers in normal operation a voltage of approximately 0.8V. To increase the total voltage output, the fuel cells can be assembled in stacks in which the fuel cells are electrically connected via flow field plates (also: interconnector plates, bipolar plates). The desired level of voltage determines the number of cells needed.

Bipolar plates separate the anode and cathode sides of adjacent cell units and at the same time enable electron conduction between anode and cathode. Interconnects, or bipolar plates are normally provided with a plurality of channels for the passage of fuel gas on one side of an interconnect plate and oxidant gas on the other side. The flow direction of the fuel gas is defined as the substantial direction from the fuel inlet portion to the fuel outlet portion of a cell unit. Likewise, the flow direction of the oxidant gas, the cathode gas, is defined as the substantial direction from the cathode inlet portion to the cathode outlet portion of a cell unit.

The cells can be stacked one on top of each other with a complete overlap resulting in a stack with for instance co-flow having all fuel and oxidant inlets on one side of the stack and all fuel and oxidant outlets on the opposite side. One feature affecting the temperatures of the structure in operation is steam reformation of the fuel that is fed into the cell. Steam reformation is an endothermic reaction and cools the fuel inlet edge of the cell.

Due to the exothermicity of the electrochemical process, the outlet gases leave at higher temperature than the inlet temperature. When endothermic and exothermic reactions are combined in an SOFC stack a significant temperature gradient across the stack is generated. Large thermal gradients induce thermal stresses in the stack which are highly undesirable and they entail differences in current density and electrical resistance. Therefore the issue of thermal management of an SOFC stack exists: to reduce thermal gradients enough to avoid unacceptable stresses and to maximize electric efficiency through homogenous current density profile.

Known fuel cells or electrolyzer cells involve thermal gradients due to uneven gas distribution over the electrolyte element. This causes lower duty ratio of the cell and thermal stresses due to uneven thermal and operational load also deteriorates the cell.

SUMMARY

A fuel flow guiding arrangement is disclosed for a solid oxide fuel cell, the cell having a fuel side, an oxygen rich side, and an electrolyte element between the fuel side and the oxygen rich side, wherein the arrangement comprises: means for guiding oxygen rich side gas to and from an electrolyte element; a flow field plate for each cell to arrange air flow on a first side of the flow field plate and flue flow on a second side of flow field plate; a flow distribution area on the flow field plate; a flow outlet area on the flow field plate; means for guiding fuel feed flow to the flow distribution area from sides of a fuel cell; means for turning at least one of a fuel feed flow on the flow distribution area and fuel outlet flow on the flow outlet area in order to equalize flow distribution on the electrolyte element; and a flow adjusting structure with flow restriction orifices having at least one geometrical shape for adjusting homogenously at least one of the fuel feed flow and fuel outlet flow over the electrolyte element based on a flow functional effect of said at least one geometrical shape of the flow adjusting structure, the flow adjusting structure having flow restriction orifices of definable height and a gasket structure having at least partly an elliptical shape as said at least one geometrical shape.

An input reactant flow guiding arrangement is also disclosed for a solid oxide electrolyzer cell, the cell having an input reactant side, an oxygen rich side, and an electrolyte element between the input reactant side and the oxygen rich side, wherein the input reactant flow guiding arrangement comprises: a flow field plate for each cell to arrange air flow on a first side of the flow field plate and fuel flow on a second side of flow field plate; a flow distribution area on the flow field plate; a flow outlet area on the flow field plate; means for guiding input reactant flow to the flow distribution area from sides of an electrolyzer cell; means for turning at least one of the input reactant feed flow on the flow distribution area and flow outlet flow on the flow outlet area in order to equalize flow distribution on an electrolyte element; and a reactant flow adjusting structure with flow restriction orifices having at least one geometrical shape for adjusting homogenously at least one of the input reactant feed flow and input reactant outlet flow over an electrolyte element based on a flow functional effect of said at least one geometrical shape of the flow adjusting structure, the flow adjusting structure having flow restriction orifices of definable height and a gasket structure having at least partly an elliptical shape as said at least one geometrical shape.

A fuel flow guiding method is also disclosed for a solid oxide fuel cell, the method comprising: guiding oxygen rich side gas to and from an electrolyte element; guiding fuel feed flow to a flow distribution area from sides of the fuel cell; turning at least one of the fuel feed flow and fuel outlet flow in order to equalize flow distribution on the electrolyte element; distributing fuel on a flow field plate; arranging an air flow on a first side of the flow field plate and a flue flow on a second side of the flow field plate; outletting fuel from the flow field plate; affecting the fuel flow by at least one geometrical shape of flow restriction orifices for adjusting homogenously at least one of the fuel feed flow and fuel outlet flow over the electrolyte element, said affecting being based on a flow functional effect of said at least one geometrical shape of the flow restriction orifices; and performing the flow adjustment via flow restriction orifices of definable height by utilizing as said at least one geometrical shape at least partly an elliptical shape of a gasket structure.

An input reactant flow guiding method is also disclosed for a solid oxide electrolyzer cell, the method comprising: guiding input reactant feed flow to a flow distribution area from sides of an electrolyzer cell; turning at least one of the input reactant feed flow and flow outlet flow in order to equalize flow distribution on an electrolyte element; distributing fuel on a flow field plate; arranging an air flow on a first side of the flow field plate and a fuel flow on a second side of flow field plate; outletting fuel from the flow field plate; affecting the reactant flow by at least one geometrical shape of flow restriction orifices for adjusting homogenously at least one of the input reactant feed flow and outlet flow over the electrolyte element, said affecting being based on a flow functional effect of said at least one geometrical shape of the flow restriction orifices; and performing the flow adjustment via flow restriction orifices of definable height by utilizing as said at least one geometrical shape at least partly an elliptical shape of a gasket structure.

DETAILED DESCRIPTION

Figure 1:
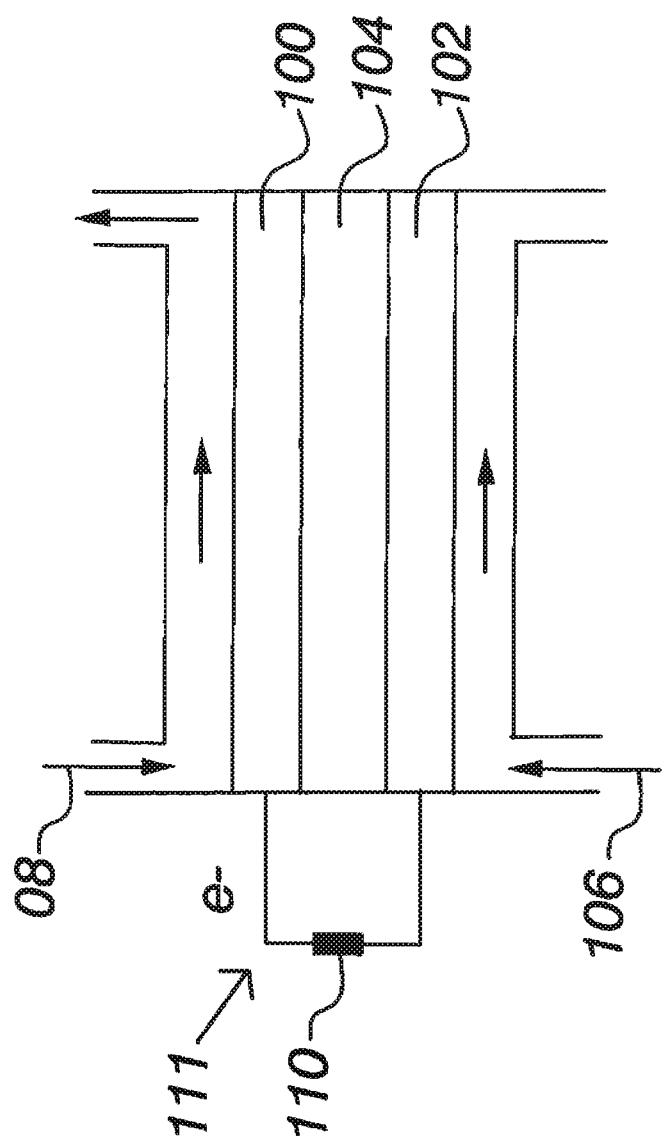
FIG. 1 presents a single fuel cell structure.

Exemplary embodiments as disclosed herein can address operational performance and lifetime of a fuel cell or electrolyzer cell by accomplishing substantially even fuel or input reactant distribution over the electrolyte element in the cell.

This can be achieved by a fuel flow guiding arrangement for a solid oxide fuel cell, the cell having a fuel side, an oxygen rich side, and an electrolyte element between the fuel side and the oxygen rich side, and the arrangement includes means for guiding oxygen rich side gas to and from the electrolyte element, a flow field plate for each cell to arrange flows in the cell, a flow distribution area on the flow field plate, and a flow outlet area on the flow field plate. The fuel flow guiding arrangement includes means for guiding fuel feed flow to the flow distribution area from sides of the fuel cell, and the arrangement includes means for turning at least one of the fuel feed flow on the flow distribution area and fuel outlet flow on the flow outlet area in order to equalize flow distribution on the electrolyte element, and a fuel flow adjusting structure having at least one geometrical shape for adjusting essentially homogenously at least one of the fuel feed flow and fuel outlet flow over the electrolyte element on the basis of the flow functional effect of the at least one geometrical shape of the fuel flow adjusting structure.

Exemplary embodiments also provide an input reactant flow guiding arrangement for a solid oxide electrolyzer cell, the cell having an input reactant side, an oxygen rich side, and an electrolyte element between the input reactant side and the oxygen rich side, and the arrangement includes a flow field plate for each cell to arrange flows in the cell, a flow distribution area on the flow field plate, and a flow outlet area on the flow field plate. The input reactant flow guiding arrangement can include means for guiding input reactant flow to the flow distribution area from sides of the electrolyzer cell, and the arrangement can include means for turning at least one of the input reactant feed flow on the flow distribution area and flow outlet flow on the flow outlet area in order to equalize flow distribution on the electrolyte element, and a reactant flow adjusting structure having at least one geometrical shape for adjusting essentially homogenously at least one of the input reactant feed flow and flow outlet flow over the electrolyte element on the basis of the flow functional effect of the at least one geometrical shape of the reactant flow adjusting structure.

Exemplary embodiments are also directed to a fuel flow guiding method for a solid oxide fuel cell, in which method is guided oxygen rich side gas to and from the electrolyte element, is distributed fuel on the flow field plate, and fuel is outlet from the flow field plate. In the method fuel feed flow is guided to a flow distribution area from sides of the fuel cell, at least one of the fuel feed flow and fuel outlet flow is turned in order to equalize flow distribution on the electrolyte element, and the fuel flow is effected by at least one geometrical shape for adjusting essentially homogenous at least one of the fuel feed flow and fuel outlet flow over the electrolyte element, the effecting being made on the basis of the flow functional effect of the at least one geometrical shape.

According to exemplary embodiments, an input reactant flow guiding method is disclosed for a solid oxide electrolyzer cell, in which method is distributed fuel on the flow field plate, and outlet fuel is provided from the flow field plate. In the method, input reactant feed flows to a flow distribution area from sides of the electrolyzer cell, at least one of the input reactant feed flow and flow outlet flow is turned in order to equalize flow distribution on the electrolyte element, and the reactant flow is effected by at least one geometrical shape for adjusting essentially homogenous at least one of the input reactant feed flow and outlet flow over the electrolyte element, the effecting being made on the basis of the flow functional effect of said at least one geometrical shape.

Exemplary embodiments are based on turning at least one of the input reactant (e.g. fuel) feed flow and flow outlet flow in order to equalize flow distribution on the electrolyte element in embodiments in which input reactant feed flow is guided to a flow distribution area from sides of the cell. Exemplary embodiments are further based on effecting the reactant flow by at least one flow structural geometrical shape for adjusting essentially homogenously at least one of the input reactant feed flow and flow outlet flow over the electrolyte element. The flow structural geometrical shape accomplishes such flow functional effect to the reactant flow such that the reactant flow is distributed more homogenously on the electrolyte element.

Exemplary embodiments also enable the electrolyte element placement to be eased during the assembly process of the said fuel cell and electrolysis cell stack. The gasket structure is shaped so that the electrolyte element can be placed in a hole in the gasket structure which then locks the electrolyte element to its desired position both during the assembly process as well as gives a support for the electrolyte element during the fuel cell and electrolyzer stack operation.

Exemplary embodiments can provide a duty ratio of the cell which is improved and a lifetime of the cell which is longer, thus making power operation of the entire cell system better and more economical as compared to known embodiments.

An exemplary fuel cell or electrolyzer stack can include at least two single repetitious structures. A single repetitious structure includes at least one electrochemically active electrolyte element structure including fuel side, electrolyte in between, and oxygen rich side, placed between at least two flow field plates the other distributing oxygen rich gas in the oxygen rich side of the electrolyte element structure and the other distributing fuel gas in the fuel side of the electrolyte element, and at least one sealing means sealing the gas atmosphere at its intended enclosure. The flow field plate has at least one inlet orifice for fuel gas and/or oxygen rich gas and at least one outlet orifice for used fuel gas and/or oxygen rich gas. The flow direction of at least one gas of fuel gas and oxygen rich gas at least in one single repetitious structure is changed compared to at least another single repetitious structure by applying sealing means that enable the utilization of gas from an inlet orifice and delivering the reaction product gas to an outlet orifice that differs from the inlet orifice and outlet orifice of at least in another single repetitious structure.

The fuel and oxygen rich gas flow directions on the electrolyte element compared to each other can be arranged to so called co-flow arrangement where both gas flows have essentially the same direction or to so-called counter-flow arrangement where the gas flow directions differ from each other essentially by 180°.

In the following, exemplary embodiments are mainly explained in relation to a solid oxide fuel cell technology. The solid oxide electrolyzer stack only differs from solid oxide fuel cell stack in that manner that electricity is used to produce fuel with reverse reactions to fuel cell reactions as is known in the art.

Figure 2:
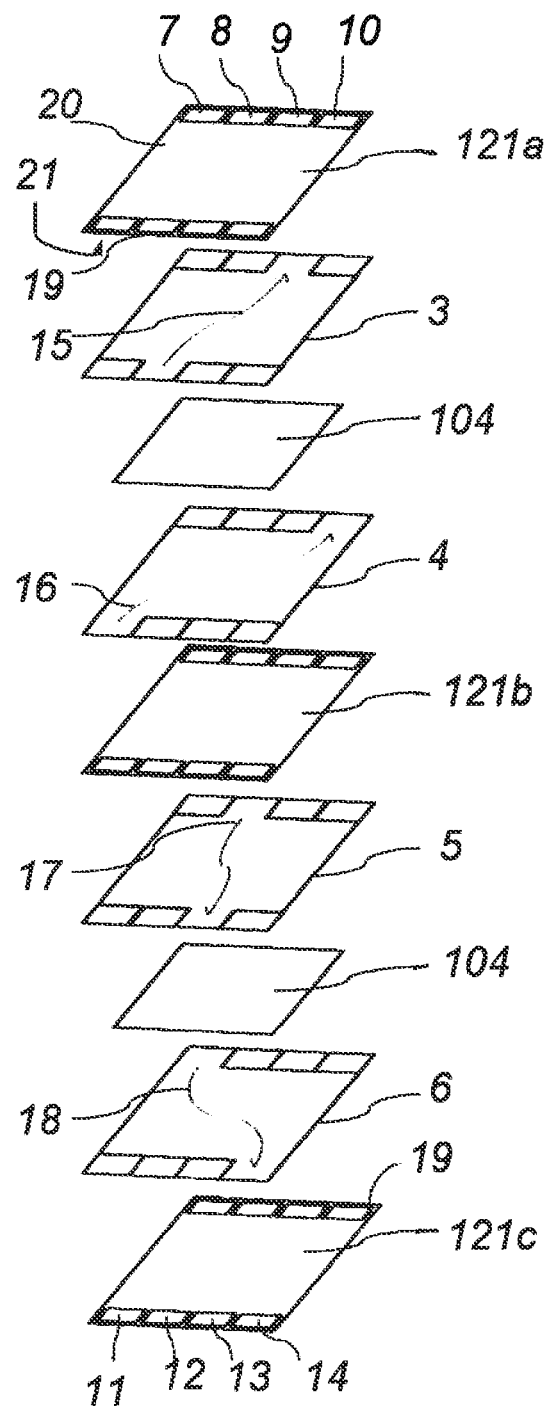
FIG. 2 presents an exemplary arrangement of flow field plates for a fuel cell stack.

FIG. 2 shows flow field plates 121*a*, 121*b*, 121*c* of a fuel cell. A complete fuel cell stack can include several plates 121 placed successively on each other in a shown manner. The plates in this embodiment are rectangular and symmetrical. An electrolyte element structure 104 having an electrolyte layer between an anode electrode and a cathode electrode is placed between the plates 121 generally (e.g., ±10%) in the middle of the plate. The electrolyte element structure 104 may be any suitable electrolyte element structure and is not therefore described herein in any further detail.

The flow field plates 121 and the electrolyte element structure 104 are sealed with sealing means 3-6. The purpose of the sealing means 3-6 is to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plate planes 121.

Two opposing flow field plates 121*a*, 121*b*, 121*c* and the electrolyte element structure 104 therebetween form a single repetitious structure. A flow field plate 121 is a planar thin plate that is made of metal alloy, ceramic material, cermet material or other material that can withstand chemical, thermal and mechanical stresses that are present in a fuel cell. According to exemplary embodiments, the flow field plate 121 includes inflow and outflow orifices placed at the edges of the plate 121. In this example the plate 121 is rectangular and flow orifices are placed on slightly shorter edges 19. Both of the edges 19 have four orifices, one inflow orifice 7, 11 for oxygen rich gas (in following exemplary embodiment: air), one outflow orifice 10, 14 for air, one inflow orifice 8, 12 for fuel, and one outflow orifice 9, 13 for fuel. The oxygen rich gas can be any gas or gas mixture, which includes a measurable amount of oxygen. On both of the edges 19 the orifices are arranged in a sequence that has first air in 7, 11, then fuel in 8, 12, then fuel out 9, 13, and then air out 10, 14.

The surfaces of the first face 20 (in the fig. top surface) and the second face 21 (below surface, not shown) around the edges of the flow field plate are shaped to allow efficient sealing and they limit a contoured surfaces 15-18 in the middle of the flow field plate that has a specific contour for guiding fuel gas and air over the surfaces of the electrolyte elements 104. It should be noted, that the reference numerals 15-18 that depict arrows related to sealing means 3-6 that illustrate gas flow routes in FIG. 1 are also used to refer to a face and a contoured surface 15-18 of a flow field plate 121*a*, 121*b*, 121*c* that is facing towards the sealing means 3-6 that faces the sealing element or structure in question.

The number of the orifices for arranging the gas flows on a fuel cell stack may vary as well as the way how the gas flows are arranged. A basic idea is that orifices 7-14 on superposed flow field plates 121 are arranged so that their positions are matched and the orifices in same line form a gas manifold channel through the stack. Sealing means 3-6 are used in order to prevent feeding of the fuel and air to wrong layers between electrolyte elements and the flow field plates. The sealing means are arranged to surround each orifice 7-14 on the flow field plate 121. The flow field plate 121 and the sealing elements 3-6 are used to form ducts (i.e. channels) that go through whole fuel cell stack. The orifices in the flow field plates are super positioned in order to form such a duct.

One possible arrangement for arranging the gas flows is described in the following. In here definitions top and bottom as well as up and down are used in conjunction with the FIG. 2 illustration only, and have no other structural meaning. First, air is fed over a flow field plate that is first in the stack. This plate 121*c* is shown in the bottom of the exploded view in FIG. 2. Now, an air path is arranged to start from air inflow channel 7 and the exit is arranged at the outflow channel 14. The air flows along the flow media 18 and is divided over the bottom surface of the electrolyte element structure 104. The electronic paths are set against electrolyte element structure and provide for guiding the gas over said surface as well as heat and electron transfer over a significantly large area. The flow medium is for example, preferably a straight channel structure but any other form may be used, for example such as sine, parabolic or zigzag curve or net type structures. On the opposite side of the electrolyte element structure 104 is the second flow field plate 121*b*.

Now, fuel is guided over the electrolyte element. This is accomplished by arranging a flow path from fuel inflow channel 8 over the underside of the second flow field plate and over the electrolyte element structure in flow media 17. Fuel is exhausted through the outflow orifice 13. In this embodiment air and fuel gases have same flow directions. On following layer gas flows are arranged as follows: air from orifice 11 to orifice 10 through gas distribution media 16, fuel from orifice 12 to orifice 9 through gas distribution media 15. The flow arrangement with varying inflow and exhaust locations can be continued with as many layers as required for the application. The purpose of varying the inflow and exhaust locations is to provide means for arranging the gas flows so that the temperatures over the fuel cell and fuel cell stack can be kept as constant as possible and the temperature gradients small.

As the flow arrangements cannot be changed after the fuel cell is assembled and in operation, the design of the flow characteristics is done by using calculations and simulation models. Further, it must be noted that each gas flow flows into a space between two flow field plates 121*a*-121*c* through inflow channel and exits therefrom via exit channel. Each inflow channel feeds fresh gas to the electrolyte element structure 104 and each outflow channel leads the exhaust gas directly out from the stack. Thus, gas flows are not redirected to further electrolyte elements. It must further be noticed that the inflow and outflow orifices do not have to be formed on to the flow field plate but they can be arranged in separate means, such as closed gas compartments.

The number of the orifice used for gas feed may vary according to the design of the fuel cell. Minimum number might be one inflow orifice for a gas as well as an outflow orifice. Using more orifices allows for more flow patterns but naturally complicates the design. According to an exemplary embodiment, the fuel gas and air flow may be arranged crosswise to each other. This can be done simply by rotating every other flow field plate 90°. The rectangular form described above can be used to simplify manufacturing and assembling processes. However, any geometric form desired may be used such as polygonal, circular, oval, etc.

Exemplary preferred manufacturing methods for forming the contoured (as example: corrugated) surface are methods using plastic deformation such as stamping, pressing and like, wherein the shape of the material is changed but no material is added or removed, or methods wherein material is added such as welding or removed such as etching. Other manufacturing methods can be utilized if the flow field material is brittle such as extrusion, casting, printing, molding, and like. The orifices for fuel and air can be for example, made in a same manufacturing step.

Each flow field plate 121 can be made similar in the stack assembly structure, such that only one type of plate is needed to produce a fuel cell stack having desired amount of repetitious electrolyte element structures 104. This simplifies the structure and eases manufacturing of the fuel cells.

Feeding in air and fuel into a SOFC can cause an uneven temperature distribution since the inlet air and fuel cool the electrolyte elements from the inlet side. On the other hand, exothermic fuel cell reactions heats up the gases on their way to the exhaust side of the electrolyte elements. The thermal distribution causes thermomechanical stresses to the SOFC structure which may cause breakage of the electrolyte element. The performance of a SOFC improves as the temperature is increased but the increased temperature speeds up aging of the cell. In order to maximize the performance and lifetime of the cell, it is essential to be able to use the cell as accurately as possible on optimum temperature over the whole cell structure. The flow guiding arrangement structure as described herein can diminish the temperature differences of the cell and thus improve reliability, performance and lifetime. Exemplary embodiments are also economically usable in stack manufacturing. As the structure is simple, benefits can be obtained in design and production.

Figure 3:
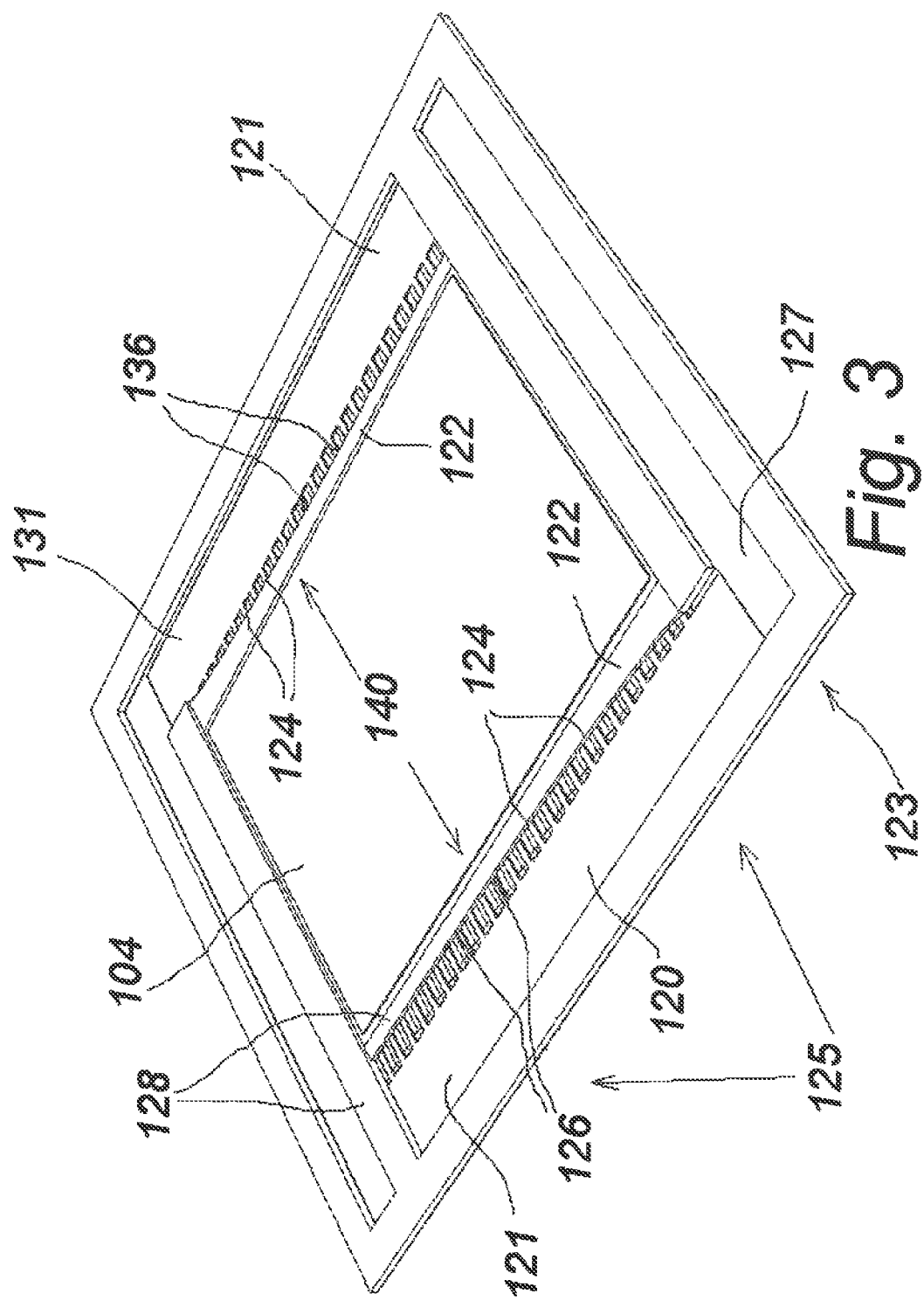
FIG. 3 presents an exemplary fuel flow guiding arrangement according to the present disclosure.

In FIG. 3 is presented an exemplary preferred fuel flow guiding arrangement according to the present disclosure, in which structure the cell includes a fuel side 100, an oxygen rich side 102, and an electrolyte element 104 between the fuel side and the oxygen rich side. The electrolyte element can for example, preferably include a flow channel area 130, but in some embodiments it can be for example a porous flow field area 130. The arrangement can include means for guiding oxygen rich side gas to and from the electrolyte element 104, and a flow field plate 121 for each cell to arrange flows in the cell. There is a flow distribution area 120 on the flow field plate 121, and a flow outlet area 131 on the flow field plate 121. The fuel flow guiding arrangement includes means 123 for guiding fuel feed flow to the flow distribution area 120 from sides 127 of the fuel cell. The arrangement can include means 125 for turning at least one of the fuel feed flow on the flow distribution area 120 and fuel outlet flow on the flow outlet area 131 in order to equalize flow distribution on the electrolyte element 104. The means 125 are for example, preferably structured by the flow field plate 121 under the electrolyte element 104 and a gasket structure 128 over the electrolyte element 104.

The exemplary embodiment of FIG. 3 includes a fuel flow adjusting structure 122 having at least one geometrical shape 124 for adjusting essentially homogenous at least one of the fuel feed flow and fuel outlet flow over the electrolyte element 104 on the basis of the flow functional effect of said at least one geometrical shape of the fuel flow adjusting structure. The flow adjusting structure 122 of the embodiment presented in FIG. 2 includes flow restriction areas, e.g. orifices 126, 136 and a gasket structure 128. For example, the gasket structure 128 includes the at least one geometrical shape 124 for adjusting essentially homogenous flow over the electrolyte element. The geometrical shape 124 is for example at least partly elliptic, e.g. ½ elliptic or ¼ elliptic or other geometrical shape 124 than ellipitic.

Figure 4:
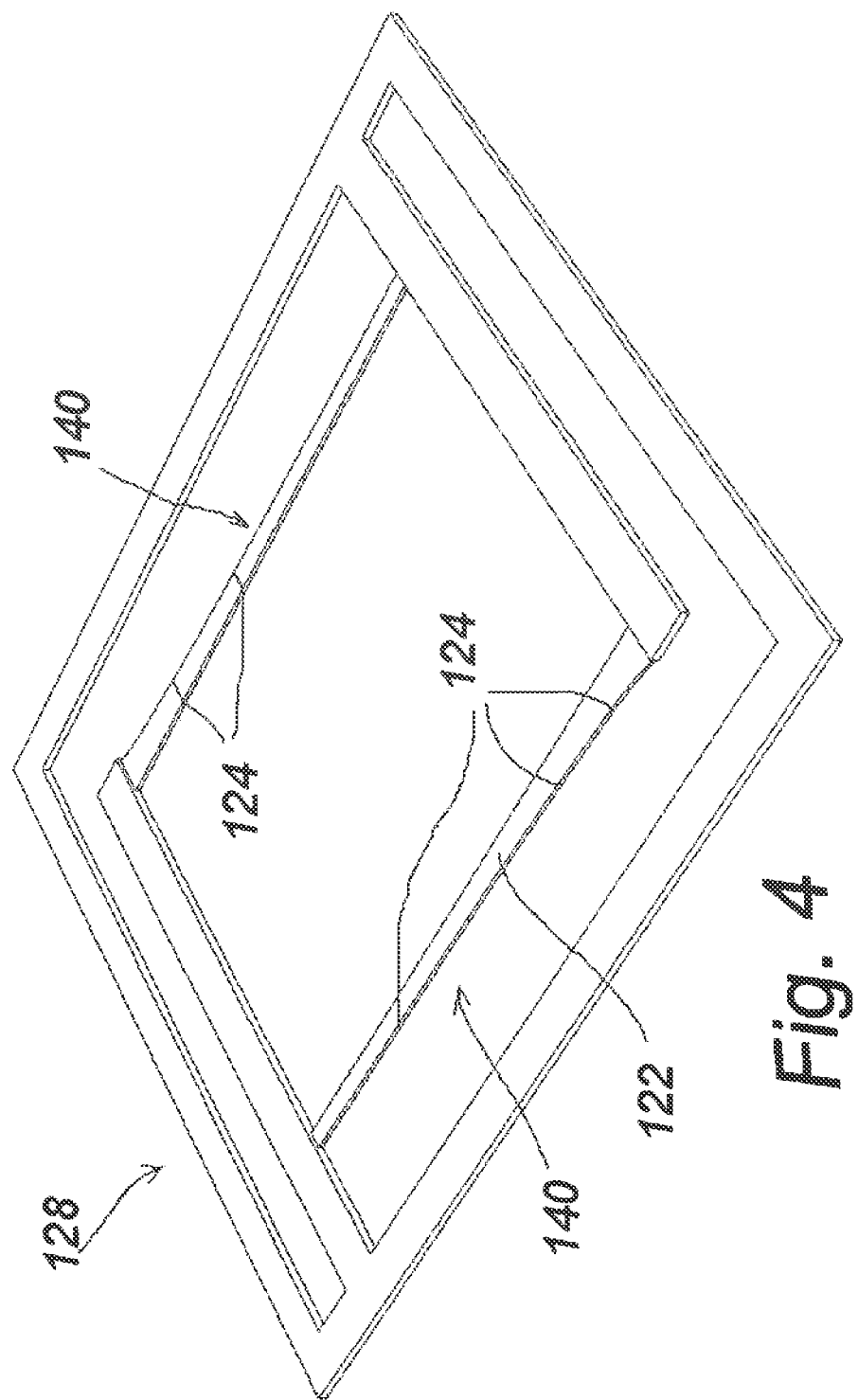
FIG. 4 presents an exemplary gasket structure according to the present disclosure.

In FIG. 4 is presented one exemplary embodiment of the gasket structure according to the present disclosure, the gasket structure having the ¼ elliptic geometrical shape 124 which is also shown in the exemplary embodiment of FIG. 3. The gasket structure 128 is for example, made of compressible material, which can be pre-compressed at least from the flow parts 140. The gasket structure is made e.g. of ceramic material. On the basis of the compression and/or pre-compression pressure loss characteristics are more controllable, and flowing conditions between different cells in the stack are achieved as substantially equal. The gasket structure on the restriction orifices area 126, 136 can be pre-compressed to a well-defined thickness in order to prevent the gasket material from spreading to the restriction orifices structure and thus in order to prevent the gasket material from changing the height characteristics of the restriction orifices.

Figure 5:
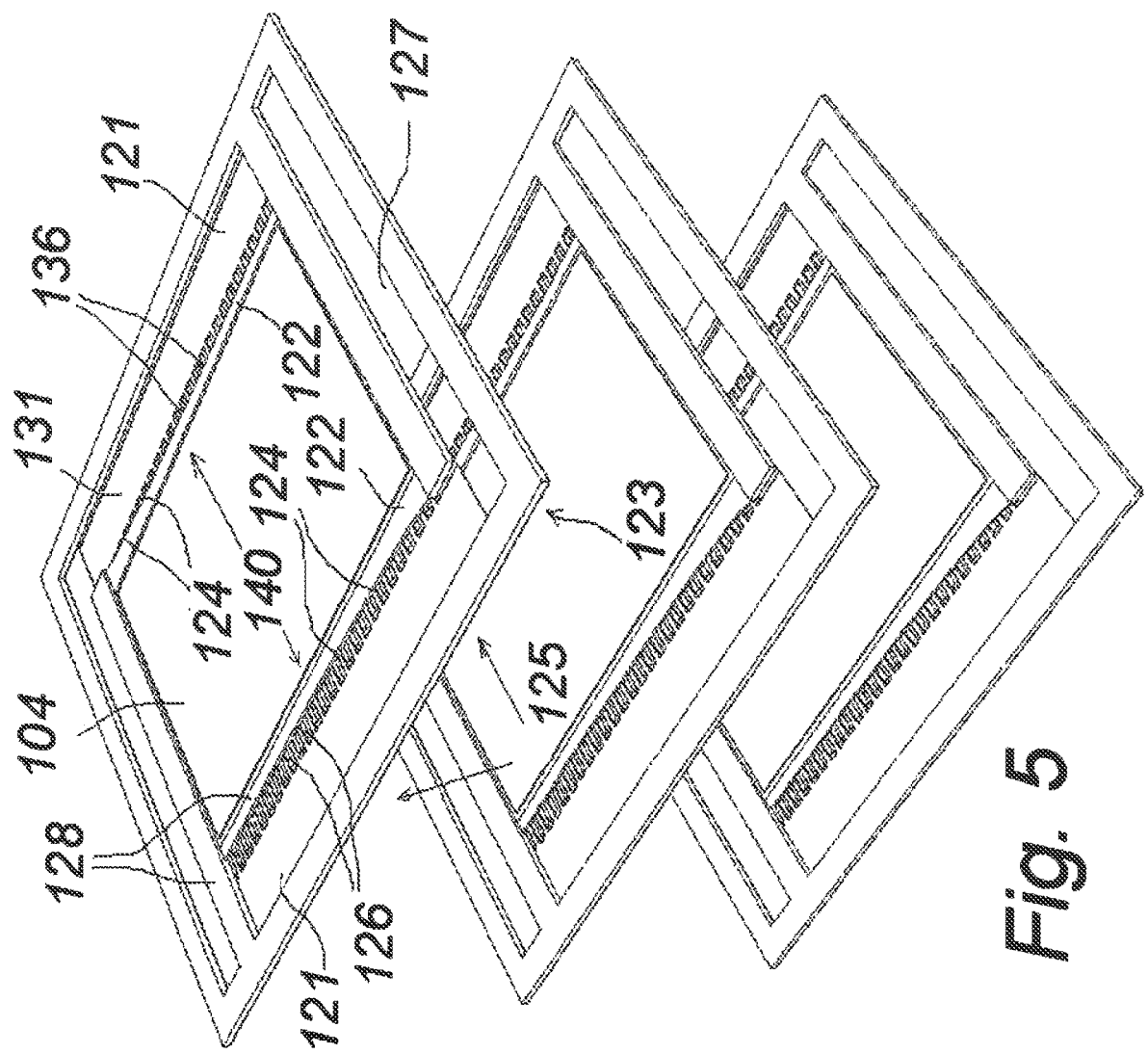
FIG. 5 presents an exemplary fuel cell stack structure.

In FIG. 5 is presented an exemplary fuel cell stack arrangement according to the present disclosure. The fuel cell stack arrangement includes flow restriction orifices 126, 136 opened to the flow distribution area 120 and to the flow outlet area 131, and a gasket structure 128 over the flow restriction orifices 126, 136. The gasket structure 128 is for example made of compressible material, which is e.g. ceramic material. The gasket structures 128 according to the present disclosure are compressed when the cells are assembled to a stack formation. The gasket structures can also be pre-compressed at least from the flow parts 140. Heights of the flow restriction orifices 126, 136 are determined by a distance from at least one of a bottom 132 of the flow distribution area 120 and of the flow outlet area 131 to a bottom 133 of the gasket structure 128 to stabilize flow distribution in the repetitious structures 138 of the stack having tolerance variations in electrolyte element 104 structure thickness. Similar pressure loss conditions between the cells are accomplished by utilizing the gasket structure 128 which can be compressed and also pre-compressed at least from the flow parts 140 in order to accomplish even thermal distribution, i.e. similar thermal gradients between the cells in the stack. Thus the duty ratio of the fuel cell stack is improved, and lifetime of the fuel cell stack is made longer.

The well-defined height of the restriction orifices structures together with the well-defined flow distribution area on the electrolyte element defines the pronounced pressure drop characteristics of a unit cell structure in a stack. The amount of pressure drop in the restriction orifices can be freely adjusted in the structure by e.g. adjusting its height, orifices geometrical shape and length of the orifices. Thus the electrolyte element structure thickness possibly having tolerance variations and defining the height of the gas distribution area results on less pronounced effect to the pressure drop characteristics of a unit cell structure. The resulting effect is that the flow distribution to each unit cell structure is essentially more homogenous compared to known stack structures that are lacking the restriction orifices structures.

Figure 6:
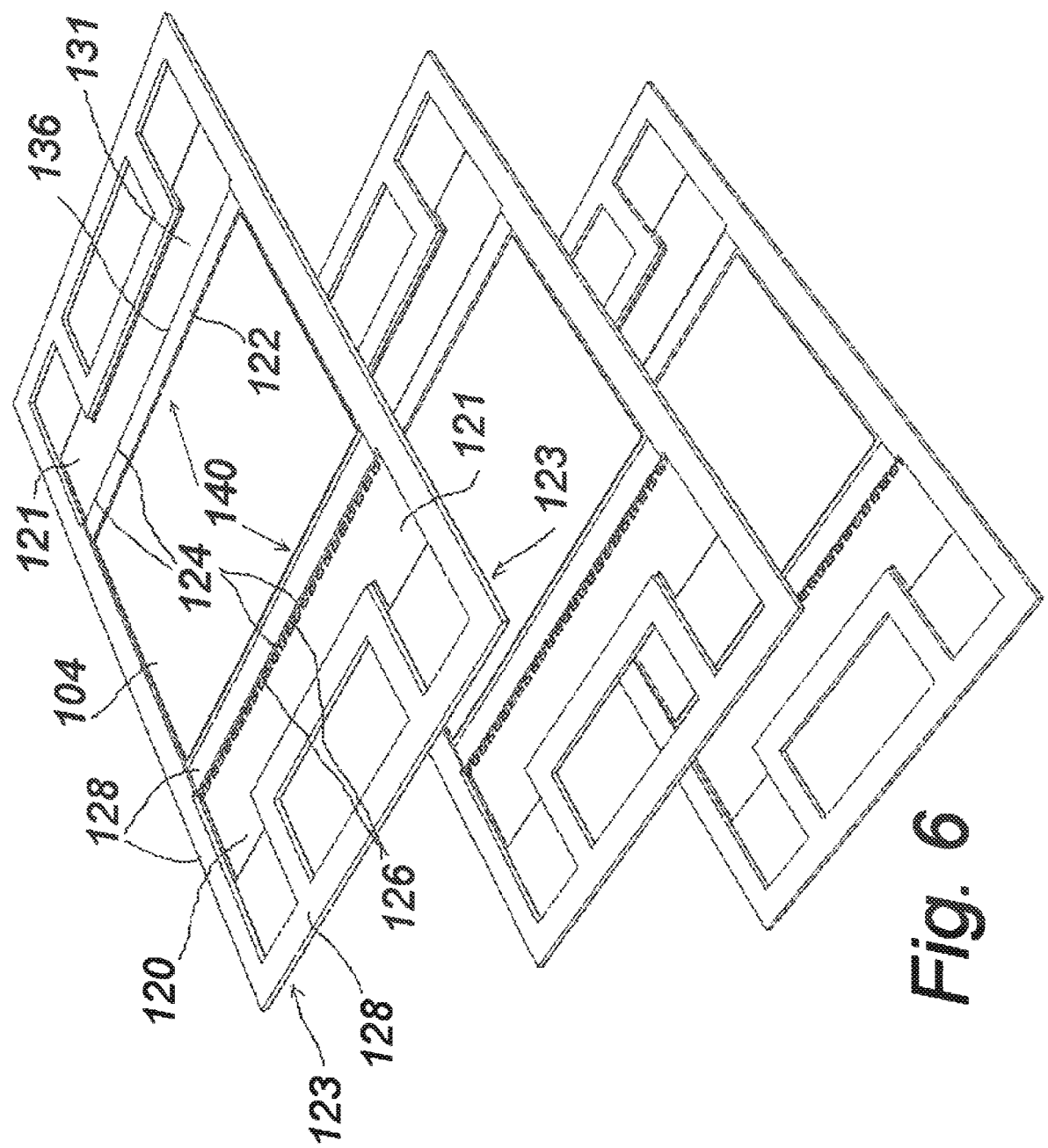
FIG. 6 presents another exemplary fuel cell stack structure.

FIG. 6 presents another exemplary fuel cell stack structure, which differs from the cell stack structure of FIG. 5 so that the means 123 guide fuel feed flow to the flow distribution area 120 from end of the fuel cell structure or electrolyzer cell structure, not from sides, and so that the gasket structure 128 includes a rectangular shape as the at least one geometrical shape 124 for adjusting essentially homogenous flow over the electrolyte element 104.

Figure 7:
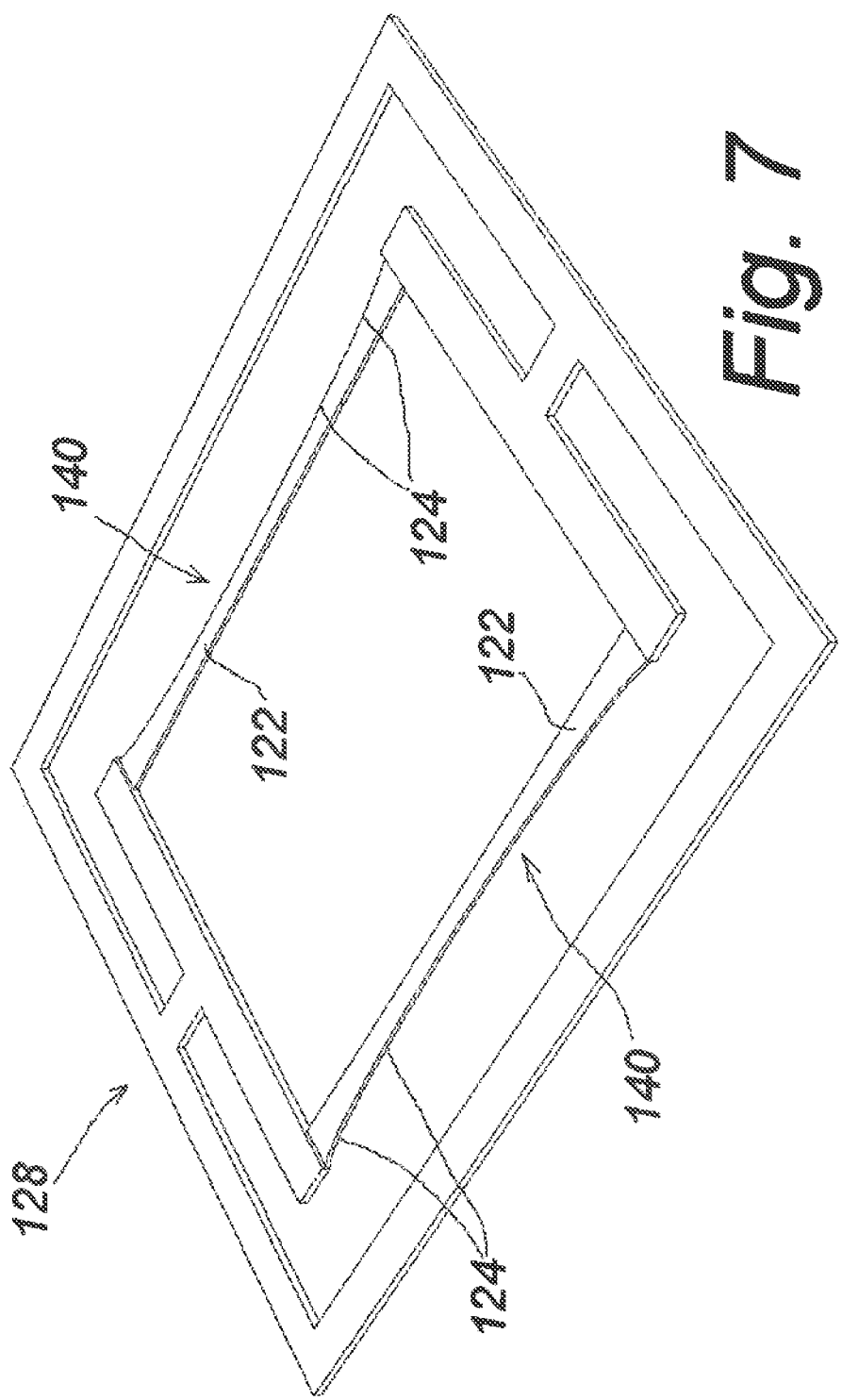
FIG. 7 presents another exemplary fuel flow guiding arrangement according to the present disclosure.

In FIG. 7 is presented another exemplary embodiment of the gasket structure according to the present disclosure, the gasket structure having the ½ elliptic geometrical shape 124. In a cell stack arrangement using a flow guiding arrangement with said ½ elliptic geometrical shape 124 or with another shapes 124 of the gasket structure 128 feed-in flows and out flows can be differently arranged than presented above related to another embodiments.

Exemplary embodiments of the disclosure can also be utilized in an arrangement in which are arranged larger flow ducts (i.e. flow channels) on the middle area of the electrolyte element and smaller flow ducts on the side areas of the electrolyte element.

Exemplary embodiments also enable the electrolyte element placement to be eased during the assembly process of the fuel cell and electrolysis cell stack. The gasket structure is shaped so that the electrolyte element can be placed a hole in the gasket structure which then locks the electrolyte element to its desired position both during the assembly process as well as gives a support for the electrolyte element during the fuel cell and electrolyzer stack operation.

Thus, while there have been shown and described and pointed out fundamental novel features disclosed herein as applied to exemplary embodiments thereof, it will be understood that various omissions and substitutions and changes in the form and details of the embodiments may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A solid oxide fuel cell including a fuel flow guiding arrangement, the solid oxide fuel cell having a fuel side, an air side, and an electrolyte element between the fuel side and the air side, wherein the arrangement comprises:
    a flow field plate for each cell to arrange air flow on a first side of the flow field plate and fuel flow on a second side of flow field plate;
    a flow distribution area on the flow field plate;
    a flow outlet area on the flow field plate;
    a side gas channel of the fuel cell located perpendicularly to a main flow direction of the fuel flow channel area for guiding fuel feed flow to the fuel distribution area, the flow distribution area being located outside of an electrochemically active electrolyte element area;
    an air inflow and outflow to and from respectively, an electrolyte element in one of the same flow direction and opposite flow direction with the main fuel flow;
    a flow adjusting structure for turning about 90° at least one of a fuel feed flow on the flow distribution area and fuel outlet flow on the flow outlet area, the flow adjusting structure including flow restriction orifices, each having a geometrical shape defining fuel flow volume of parallel fuel flow channels in order to equalize flow distribution on the electrolyte element, the flow adjusting structure being located outside of the electrochemically active electrolyte element area; and
    the flow adjusting structure having at least partly an elliptical shape as said at least one geometrical shape, wherein the solid oxide fuel cell is configured to operate at a temperature range of 500°-1000° C.

2. The solid oxide fuel cell according to claim 1, wherein the electrolyte element comprises:
    at least one of a flow channel area and of a porous flow field area.

3. The solid oxide fuel cell according to claim 1, wherein the flow adjusting structure comprises a gasket structure having:
    the at least one geometrical shape for adjusting homogenously flow over the electrolyte element based on a flow functional effect of said at least one geometrical shape.

4. The solid oxide fuel cell according to claim 3, wherein the gasket structure is pre-compressed at least from the flow parts.

5. The solid oxide fuel cell according to claim 3, wherein a height of the flow restriction orifices is determined by a distance from at least one of a bottom of the flow distribution area and of the flow outlet area to a bottom of the gasket structure to stabilize flow distribution in repetitious structures of a fuel cell, the stack having tolerance variations in electrolyte element structure thickness.

* * * * *